US010076842B2

United States Patent
Liu et al.

(10) Patent No.: US 10,076,842 B2
(45) Date of Patent: Sep. 18, 2018

(54) SIMULTANEOUS KINEMATIC AND HAND-EYE CALIBRATION

(71) Applicant: Cognex Corporation, Natick, MA (US)

(72) Inventors: Lifeng Liu, Sudbury, MA (US); Cyril C. Marrion, Acton, MA (US); Tian Gan, Seattle, WA (US)

(73) Assignee: Cognex Corporation, Natick, MA (US)

( * ) Notice: Subject to any disclaimer, the term of this patent is extended or adjusted under 35 U.S.C. 154(b) by 178 days.

(21) Appl. No.: 15/278,156

(22) Filed: Sep. 28, 2016

(65) Prior Publication Data
US 2018/0089831 A1    Mar. 29, 2018

(51) Int. Cl.
*G06T 7/00* (2017.01)
*B25J 9/16* (2006.01)

(52) U.S. Cl.
CPC .......... *B25J 9/1697* (2013.01); *B25J 9/1692* (2013.01); *G06T 7/0018* (2013.01); *G06T 7/0044* (2013.01); *G05B 2219/40607* (2013.01)

(58) Field of Classification Search
CPC ......... B25J 9/1697; B25J 9/1692; G06T 7/00; G05B 2219/40607
See application file for complete search history.

(56) References Cited

U.S. PATENT DOCUMENTS

2011/0280472 A1* 11/2011 Wallack ................ B25J 9/1692
382/153
2016/0039094 A1* 2/2016 Lundberg ............. B25J 9/1692
700/251

* cited by examiner

*Primary Examiner* — Huy Thanh Nguyen
(74) *Attorney, Agent, or Firm* — Proskauer Rose LLP (57) ABSTRACT

Described are machine vision systems and methods for simultaneous kinematic and hand-eye calibration. A machine vision system includes a robot or motion stage and a camera in communication with a control system. The control system is configured to move the robot or motion stage to poses, and for each pose: capture an image of calibration target features and robot joint angles or motion stage encoder counts. The control system is configured to obtain initial values for robot or motion stage calibration parameters, and determine initial values for hand-eye calibration parameters based on the initial values for the robot or motion stage calibration parameters, the image, and joint angles or encoder counts. The control system is configured to determine final values for the hand-eye calibration parameters and robot or motion stage calibration parameters by refining the hand-eye calibration parameters and robot or motion stage calibration parameters to minimize a cost function.

30 Claims, 5 Drawing Sheets

SIMULTANEOUS KINEMATIC AND HAND-EYE CALIBRATION

FIELD OF THE TECHNOLOGY

The present technology relates generally to machine vision systems and, more specifically, to calibrating machine vision systems by simultaneously refining kinematic chain of robots/motion stages and hand-eye calibration parameters.

BACKGROUND

In machine vision systems, one or more cameras can be used to perform vision system processes on an object or surface within an imaged scene. These processes can include inspection, alignment, and/or a variety of other tasks. The images captured by the one or more cameras can be processed by the machine vision system to determine information about features within the imaged scene, such as features' real-world locations, poses, etc. In some applications, a machine vision system can include a robot, motion stage, or other device whose pose and movement is controlled by the machine vision system (e.g., Vision Guided Robot (VGR) applications). For example, the machine vision system can analyze the images captured by the one or more cameras to determine how to move the robot or motion stage to move or interact with objects in the imaged scene. In some applications, the machine vision system can be calibrated to allow the machine vision system to perform vision tasks with increased accuracy and reliability.

SUMMARY

The technology described herein can improve the accuracy and precision of existing machine vision systems by improving the kinematics modelling of the robot/motion stage and the calibration of the machine vision system.

In one aspect, there is a machine vision system. The machine vision system includes a robot. The machine vision system includes a camera. The machine vision system includes a control system in communication with the robot and the camera. The control system is configured to move the robot to a plurality of poses, and for each pose of the plurality of poses: capture, with the camera, an image of one or more features on a calibration target and capture a plurality of robot joint angles. The control system is configured to obtain a plurality of initial values for a plurality of robot calibration parameters. The control system is configured to determine a plurality of initial values for a plurality of hand-eye calibration parameters based on the plurality of initial values for the plurality of robot calibration parameters, and the image and the plurality of robot joint angles captured for each of the plurality of poses. The control system is configured to determine a plurality of final values for the plurality of hand-eye calibration parameters and a plurality of final values for the robot calibration parameters by refining one or more of the plurality of hand-eye calibration parameters and one or more of the plurality of robot calibration parameters to minimize a cost function.

In some embodiments, the control system is further configured to use the plurality of final values for the plurality of hand-eye calibration parameters and the plurality of final values for the robot calibration parameters for a vision guided robot application. In some embodiments, the control system is further configured to move the robot using the plurality of final values for the robot calibration parameters.

In some embodiments, the cost function measures, for each pose of the plurality of poses, a difference between an observed location of a feature in the image captured for the pose and an expected location of the feature, the expected location determined based on a first plurality of values for the plurality of robot calibration parameters, a second plurality of values for the plurality of hand-eye calibration parameters, and the plurality of robot joint angles captured for the pose. In some embodiments, the cost function measures, for each pose of the plurality of poses, a difference between a composite transformation and an identity transformation, the composite transformation being a composition of a first transformation from a first coordinate space to a second coordinate space and a second transformation from the second coordinate space to the first coordinate space, the first transformation and the second transformation determined based on a first plurality of values for the plurality of robot calibration parameters, a second plurality of values for the plurality of hand-eye calibration parameters, the plurality of observed features of the calibration target for the pose, and the plurality of robot joint angles captured for the pose. In some embodiments, the cost function measures, for each pose of the plurality of poses, a difference between a robot joint angle of the plurality of robot joint angles captured for the pose and an estimated joint angle for the pose, the estimated joint angle determined based on a first plurality of values for the plurality of robot calibration parameters, a second plurality of values for the plurality of hand-eye calibration parameters, and the plurality of observed features of the calibration target for the pose.

In some embodiments, the control system is further configured to minimize the cost function using non-linear least squares. In some embodiments, the control system is configured to refine less than all of the plurality of hand-eye calibration parameters and less than all of the plurality of robot calibration parameters. In some embodiments, the plurality of robot calibration parameters includes Denavit-Hartenberg parameters for the robot.

In another aspect, there is a machine vision system-implemented calibration method. The method includes moving, by a control system, a robot to a plurality of poses, and for each pose of the plurality of poses: capturing, by a camera, an image of one or more features on a calibration target and capturing, by the control system, a plurality of robot joint angles. The method includes obtaining, by the control system, a plurality of initial values for a plurality of robot calibration parameters. The method includes determining, by the control system, a plurality of initial values for a plurality of hand-eye calibration parameters based on the plurality of initial values for the plurality of robot calibration parameters, and the image and the plurality of robot joint angles captured for each of the plurality of poses. The method includes determining, by the control system, a plurality of final values for the plurality of hand-eye calibration parameters and a plurality of final values for the plurality of robot calibration parameters by refining one or more of the plurality of hand-eye calibration parameters and one or more of the plurality of robot calibration parameters to minimize a cost function.

In some embodiments, the cost function measures, for each pose of the plurality of poses, a difference between an observed location of a feature in the image captured for the pose and an expected location of the feature, the expected location determined based on a first plurality of values for the plurality of robot calibration parameters, a second plurality of values for the plurality of hand-eye calibration parameters, and the plurality of robot joint angles captured for the pose. In some embodiments, the cost function measures, for each pose of the plurality of poses, a difference between a composite transformation and an identity transformation, the composite transformation being a composition of a first transformation from a first coordinate space to a second coordinate space and a second transformation from the second coordinate space to the first coordinate space, the first transformation and the second transformation determined based on a first plurality of values for the plurality of robot calibration parameters, a second plurality of values for the plurality of hand-eye calibration parameters, the plurality of observed features of the calibration target for the pose, and the plurality of robot joint angles captured for the pose. In some embodiments, the cost function measures, for each pose of the plurality of poses, a difference between a robot joint angle of the plurality of robot joint angles captured for the pose and an estimated joint angle for the pose, the estimated joint angle determined based on a first plurality of values for the plurality of robot calibration parameters, a second plurality of values for the plurality of hand-eye calibration parameters, and the plurality of observed features of the calibration target for the pose.

In some embodiments, the method includes minimizing the cost function using non-linear least squares. In some embodiments, the method includes refining less than all of the plurality of hand-eye calibration parameters and less than all of the plurality of robot calibration parameters. In some embodiments, the plurality of robot calibration parameters includes Denavit-Hartenberg parameters for the robot.

In another aspect, there is a machine vision system. The machine vision system includes a motion stage. The machine vision system includes a camera. The machine vision system includes a control system in communication with the motion stage and the camera. The control system is configured to move the motion stage to a plurality of poses, and for each pose of the plurality of poses: capture, with the camera, an image of one or more features on a calibration target and capture a plurality of encoder counts for a plurality of actuators of the motion stage. The control system is configured to obtain a plurality of initial values for a plurality of motion stage calibration parameters. The control system is configured to determine a plurality of initial values for a plurality of hand-eye calibration parameters based on the plurality of initial values for the plurality of motion stage calibration parameters, and the image and the plurality of encoder counts captured for each of the plurality of poses. The control system is configured to determine a plurality of final values for the plurality of hand-eye calibration parameters and a plurality of final values for the motion stage calibration parameters by refining one or more of the plurality of hand-eye calibration parameters and one or more of the plurality of motion stage calibration parameters to minimize a cost function.

In some embodiments, the control system is further configured to use the plurality of final values for the plurality of hand-eye calibration parameters and the plurality of final values for the motion stage calibration parameters for a vision guided motion stage application. In some embodiments, the control system is further configured to move the motion stage using the plurality of final values for the motion stage calibration parameters.

In some embodiments, the cost function measures, for each pose of the plurality of poses, a difference between an observed location of a feature in the image captured for the pose and an expected location of the feature, the expected location determined based on a first plurality of values for the plurality of motion stage calibration parameters, a second plurality of values for the plurality of hand-eye calibration parameters, and the plurality of encoder counts captured for the pose. In some embodiments, the cost function measures, for each pose of the plurality of poses, a difference between an encoder count of the plurality of encoder counts captured for the pose and an estimated encoder count for the pose, the estimated encoder count determined based on a first plurality of values for the plurality of motion stage calibration parameters, a second plurality of values for the plurality of hand-eye calibration parameters, and the plurality of observed features of the calibration target for the pose.

In some embodiments, the control system is further configured to minimize the cost function using non-linear least squares. In some embodiments, the control system is configured to refine less than all of the plurality of hand-eye calibration parameters and less than all of the plurality of motion stage calibration parameters. In some embodiments, the plurality of motion stage calibration parameters includes one or more of roller center position, roller radius, direction, step size, home encoder count, and striker plate's direction for an actuator.

In another aspect, there is a machine vision system-implemented calibration method. The method includes moving, by a control system, a motion stage to a plurality of poses, and for each pose of the plurality of poses: capture, by a camera, an image of one or more features on a calibration target; and capturing, by the control system, a plurality of encoder counts for a plurality of actuators of the motion stage. The method includes obtaining, by the control system, a plurality of initial values for a plurality of motion stage calibration parameters. The method includes determining, by the control system, a plurality of initial values for a plurality of hand-eye calibration parameters based on the plurality of initial values for the plurality of motion stage calibration parameters, and the image and the plurality of encoder counts captured for each of the plurality of poses. The method includes determining, by the control system, a plurality of final values for the plurality of hand-eye calibration parameters and a plurality of final values for the motion stage calibration parameters by refining one or more of the plurality of hand-eye calibration parameters and one or more of the plurality of motion stage calibration parameters to minimize a cost function.

In some embodiments, the cost function measures, for each pose of the plurality of poses, a difference between an observed location of a feature in the image captured for the pose and an expected location of the feature, the expected location determined based on a first plurality of values for the plurality of motion stage calibration parameters, a second plurality of values for the plurality of hand-eye calibration parameters, and the plurality of encoder counts captured for the pose. In some embodiments, the cost function measures, for each pose of the plurality of poses, a difference between an encoder count of the plurality of encoder counts captured for the pose and an estimated encoder count for the pose, the estimated encoder count determined based on a first plurality of values for the plurality of motion stage calibration parameters, a second plurality of values for the plurality of hand-eye calibration parameters, and the plurality of observed features of the calibration target for the pose.

In some embodiments, the method includes minimizing the cost function using non-linear least squares. In some embodiments, the method includes refining less than all of the plurality of hand-eye calibration parameters and less than all of the plurality of motion stage calibration parameters. In some embodiments, the plurality of motion stage calibration parameters includes one or more of roller center position, roller radius, direction, step size, home encoder count, and striker plate's direction for an actuator.

Other aspects and advantages of the technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

Precisely calibrating machine vision systems for VGR applications can be critical. Existing approaches to calibrating such machine vision systems (e.g., machine vision systems with a robot, motion stage, or other device) can result in machine vision systems that do not have the requisite accuracy for many applications. For example, in many cases, calibrating the machine vision system based on the kinematic calibration parameter values (e.g., robot calibration parameter values or motion stage calibration parameter values) provided by robot or motion stage manufacturers can lead to inadequate accuracy of the machine vision system. The present technology can improve the accuracy and precision of machine vision systems for VGR applications by using efficient calibration techniques to refine kinematic calibration parameters and hand-eye calibration parameters. The technology can be used to determine more accurate calibration parameter values, including the hand-eye calibration parameters and kinematic calibration parameters, in a single refinement calculation based on measurements determined by the machine vision system. Beneficially, the technology can increase the accuracy of the machine vision systems through improved calibration without, for example, requiring additional calibration targets, additional cameras, or external measurement equipment.

I. Machine Vision Systems

Figure 1:
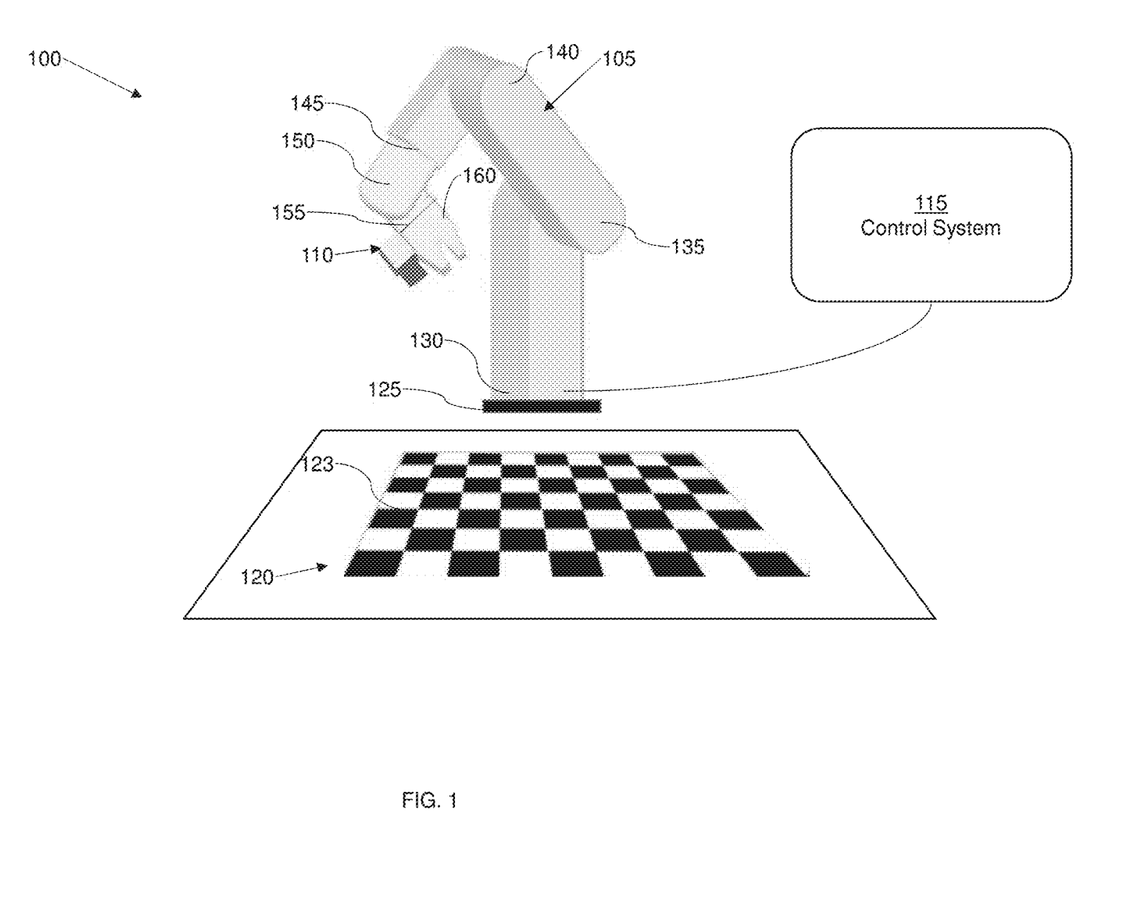
FIG. 1 illustrates an exemplary machine vision system.

FIG. 1 illustrates exemplary machine vision system 100. Machine vision system 100 can be used, for example, for VGR applications. Machine vision system 100 includes robot 105 with a camera 110 mounted thereon, and control system 115. FIG. 1 illustrates a moving camera configuration (e.g., camera 110 is mounted on the arm of robot 105). Still referring to FIG. 1, calibration target 120 having features 123 is shown. Camera 110 can be an area-scan camera including a two-dimensional CCD camera sensor, a two-dimensional CMOS camera sensor or any other type of camera sensor for generating images. Control system 115 can be any processing device (e.g., embedded machine vision processor, computing device, etc.).

Control system 115 is in communication with robot 105 and camera 110. Control system 115 can receive image data from camera 110 and control the pose of robot 105. In some embodiments, Control system 115 can be a part of a stand-alone computing device. In some embodiments, control system 115 can be a part of robot 105. In some embodiments, control system 115 can be a part of camera 110. In operation, control system 115 can manipulate the pose of robot 105, e.g., based on analysis of image data from camera 110. For simplicity, control system 115 is illustrated as a single component. In some embodiments, the control system can include a motion controller (e.g., a robot controller) and a machine vision processor working in concert. In some embodiments, the motion controller can be the machine vision system master. For example, the motion controller can communicate with and direct the actions of the machine vision processor. The motion controller can control the pose and movement of the robot and cause the machine vision processor to acquire images. The motion controller can provide pose information to the machine vision processor and cause the machine vision processor to perform the calibration described herein. In some embodiments, the machine vision processor can be the machine vision system master. For example, the machine vision processor can communicate with and direct the actions of the motion controller. The machine vision processor can cause the motion controller to control the pose and movement of the robot, and provide pose information to the machine vision processor. The machine vision processor can acquire images and perform the calibration described herein. In some embodiments, the motion controller and machine vision controller can be integrated. For example, one or more processor cores of a control system can control robot motion and one or more processor cores of the control system can perform machine vision processing such as calibration.

In accordance with the technology, the machine vision system 100 can be calibrated. As will be described in greater detail below, system 100 can be calibrated to permit transformation of coordinates between the image coordinate space of camera 110, the coordinate spaces of the robot 105, and the coordinate space of calibration target 120. Using the calibration, control system 115 can direct robot hand 160 to precise locations in the coordinate space of calibration target 120 or in the robot base coordinate space. Control system 115 can further determine the location of objects observed in image data from camera 110 by using the calibration and information about the angles of the joints of robot 105. Beneficially, the calibration permits machine vision system to control the motion of robot hand 160 and use it to interact with and/or manipulate real-world objects (e.g., in the coordinate space of calibration target 120).

Figure 2:
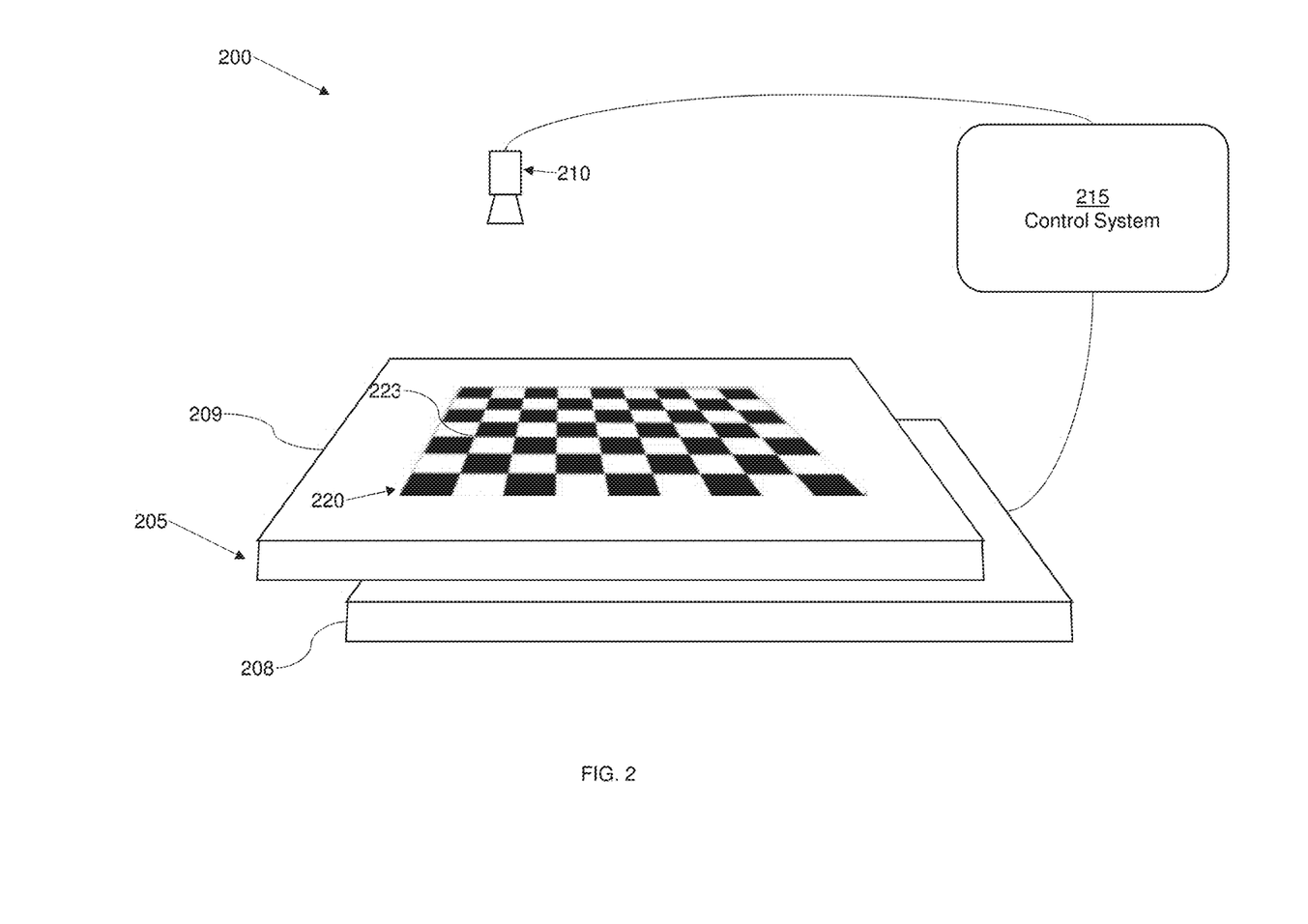
FIG. 2 illustrates an exemplary machine vision system.

FIG. 2 illustrates exemplary machine vision system 200. Machine vision system 200 can be used, for example, for VGR applications. Machine vision system 200 includes motion stage 205, camera 210, and control system 215. As illustrated, camera 210 can be mounted above motion stage 205 to image a top surface of motion stage 205. In the illustrated embodiment, camera 210 is mounted in a fixed way relative to base 208 of motion stage 205 (e.g., table 209 of motion stage 205 can move relative to camera 210). Camera 210 can be an area-scan camera including a two-dimensional CCD camera sensor, a two-dimensional CMOS camera sensor or any other type of camera sensor for generating images. Control system 215 can be any processing device (e.g., embedded machine vision processor, computing device, etc.). Still referring to FIG. 2, calibration target 220 having features 223 is shown.

Control system 215 is in communication with motion stage 205 and camera 210. Control system can receive image data from camera 210 and control the pose of motion stage 205. In some embodiments, control system 215 can be a part of a standalone computing device. In some embodiments, control system 215 can be a part of motion stage 205. In some embodiments, control system 215 can be a part of camera 210. In operation, control system 215 can change the pose of motion stage 205, e.g., based on analysis of image data from camera 210. For simplicity, control system 215 is illustrated as a single component. In some embodiments, the control system can include a motion controller (e.g., a motion stage controller) and a machine vision processor working in concert. In some embodiments, the motion controller can be the machine vision system master. For example, the motion controller can communicate with and direct the actions of the machine vision processor. The motion controller can control the pose and movement of the motion stage and cause the machine vision processor to acquire images. The motion controller can provide pose information to the machine vision processor and cause the machine vision processor to perform the calibration described herein. In some embodiments, the machine vision processor can be the machine vision system master. For example, the machine vision processor can communicate with and direct the actions of the motion controller. The machine vision processor can cause the motion controller to control the pose and movement of the motion stage, and provide pose information to the machine vision processor. The machine vision processor can acquire images and perform the calibration described herein. In some embodiments, the motion controller and machine vision controller can be integrated. For example, one or more processor cores of a control system can control motion stage motion and one or more processor cores of the control system can perform machine vision processing such as calibration.

In accordance with the technology, machine vision system 200 can be calibrated. As will be described in greater detail below, system 200 can be calibrated to permit transformation of coordinates between the image coordinate space of camera 210, the coordinate spaces of motion stage 205, and the coordinate space of calibration target 220. Using the calibration, control system 215 can translate and/or rotate motion stage 205 to precise poses in the coordinate space of calibration target 220 or in the coordinate space of motion stage 205. Control system 215 can further determine the location of objects observed in image data from camera 210 by using the calibration and information about the actuators of motion stage 105. Beneficially, the calibration permits machine vision system 200 to control the motion of motion stage 205 and use it to move real-world objects on its surface (e.g., in the coordinate space of calibration target 220).

It should be appreciated that the illustrated embodiments are merely exemplary machine vision system configurations. In some embodiments, the machine vision system can include other kinds of robots, other kinds of motion stages, or other devices whose movement can be controlled by the machine vision system. In some embodiments, the camera can be mounted to the robot or motion stage, or a fixture independent of the robot or motion stage (e.g., stationary camera scenarios and/or moving camera scenarios). In some embodiments, more than one camera can be used. In some embodiments, the robot or motion stage can interact with multiple workspaces.

II. Calibration

The technology can facilitate improved accuracy of machine vision systems by providing an efficient technique for refining calibration parameter values. Generally, calibration parameters can include hand-eye calibration parameters, as are well known in the art. In the case of machine vision systems with robots, calibration parameters can include robot calibration parameters. In the case of machine vision systems with motion stages, calibration parameters can include motion stage calibration parameters. Robot calibration parameters and/or motion stage calibration parameters can be referred to as kinematic calibration parameters. For robots, robot calibration parameters can include the Denavit-Hartenberg parameters (D-H parameters) used for describing, e.g., the links and joints of robots. As another example, UVW motion stages are motion stages that can, for example, include two actuators moving in the X direction, and one actuator moving in Y direction. For UVW motion stages, motion stage calibration parameters can include, for each actuator, the roller's center position, the roller's radius, the actuator's direction, the actuator's step size, the actuator's home encoder count, and the striker plate's direction. As still another example, XY Theta motion stages are motion stages that can, for example, include an actuator for linear translation along the X axis, an actuator for linear translation along the Y axis, and a theta actuator providing rotation. For XY Theta motion stages, motion stage calibration parameters can include, direction and step size for each of the X and Y actuators, and the roller's center position and radius, the actuator's direction and step size, the striker plate's direction for the theta actuator. More generally, the technology can be used for calibration of motion devices that can be modeled geometrically. For example, the technology can be used for calibration of motion devices whose geometry can be represented with calibration parameter values.

A. Calibration for Machine Vision Systems with Robots

The technology can refine calibration parameter values by minimizing the inaccuracies caused by robots' variance from their specifications and other conditions. In an exemplary embodiment of the technology, a robot (e.g., robot 105) is moved to a plurality of poses, and for each pose the machine vision system captures an image (e.g., via camera 110) of a calibration target (e.g., calibration target 120) and the robot's joint angles at that pose. Initial calibration parameter values can be determined. For example, initial robot calibration parameter values can be taken from the robot's specification. Initial hand-eye calibration parameter values can be determined using the captured images and the initial robot calibration parameter values. Calibration functionality for determining the initial hand-eye calibration parameter values is commercially available, such as in the Cognex Vision Library® produced by Cognex Corporation. One or more initial calibration parameter values, including one or more robot calibration parameter values and one or more hand-eye calibration parameters, can then be refined to determine final calibration parameter values. For example, by using a nonlinear optimization method to minimize the overall discrepancy between the robot motion, which can be determined using the robot calibration parameters and the joint angles, and the motion observed by the machine vision system. The final calibration parameter values can then be used by the machine vision system to operate the robot during runtime. For example, the final robot calibration parameter values can be used to control the robot more accurately. The final hand-eye calibration parameter values can further improve the performance of the machine vision system at run time.

Figure 3:
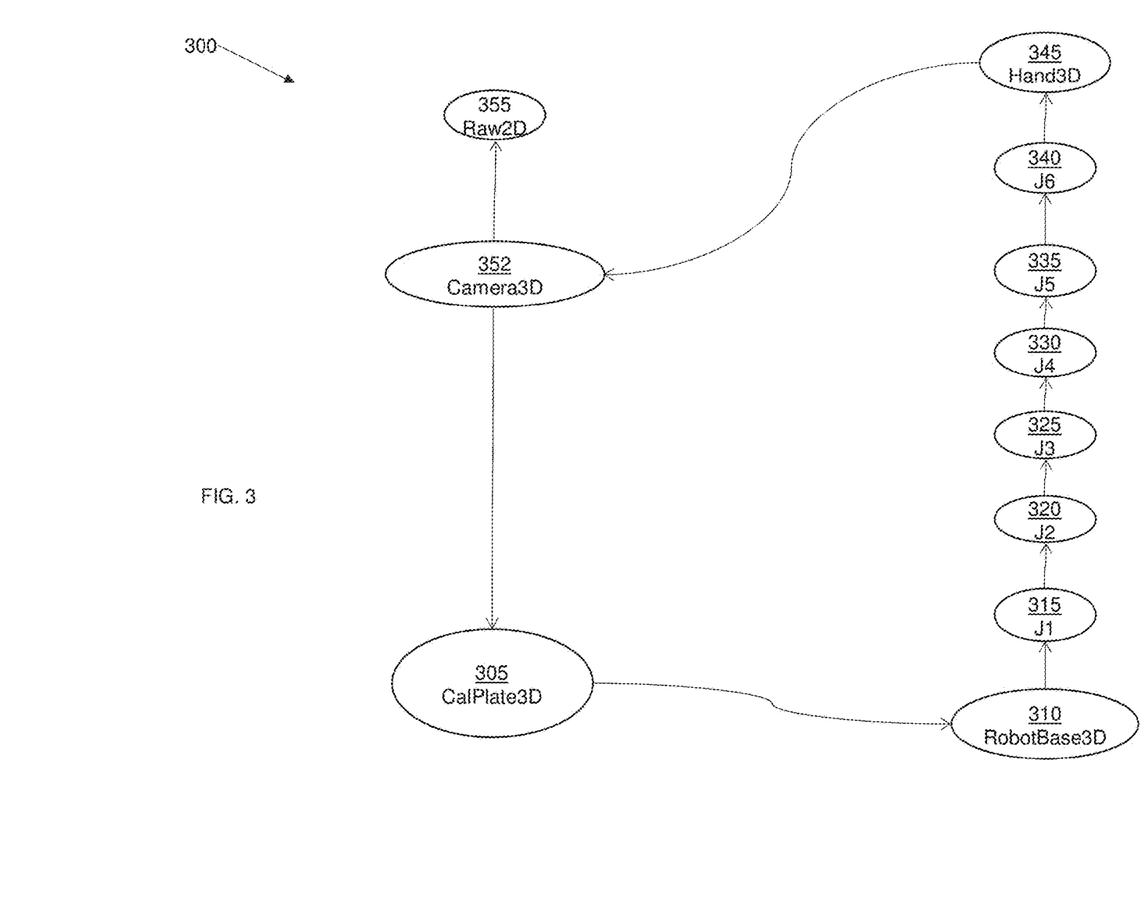
FIG. 3 depicts a calibration scheme in accordance with the technology.

FIG. 3 depicts calibration scheme 300 in accordance with the technology. In some embodiments, the calibration scheme can be used for moving camera configurations. For example, calibration scheme 300 can be used for machine vision system 100 of FIG. 1. In FIG. 3, the ovals represent coordinate spaces. FIG. 3 includes CalPlate3D coordinate space 305, RobotBase3D coordinate space 310, Joint1 coordinate space 315, Joint2 coordinate space 320, Joint3 coordinate space 325, Joint4 coordinate space 330, Joint5 coordinate space 335, Joint6 coordinate space 340, Hand3D coordinate space 345, Camera3D coordinate space 352, and Raw2D coordinate space 355. Arrows between ovals represent transformations between the illustrated coordinate spaces. The calibration parameter values used for the transformations can be determined and refined, as described with respect to the illustrative calibration methods below.

In the illustrated example, CalPlate3D coordinate space 305 can be the coordinate space of calibration target 120, and can be defined by the top surface of calibration target 120. RobotBase3D coordinate space 310 can be the coordinate space of base 125 of robot 105. In some embodiments, RobotBase3D coordinate space 310 can be defined by the robot manufacturer. Joint1 coordinate space 315 can be the coordinate space of joint 130 of robot 105. Joint2 coordinate space 320 can be the coordinate space of joint 135 of robot 105. Joint3 coordinate space 325 can be the coordinate space of joint 140 of robot 105. Joint4 coordinate space 330 can be the coordinate space of joint 145 of robot 105. Joint5 coordinate space 335 can be the coordinate space of joint 150 of robot 105. Joint6 coordinate space 340 can be the coordinate space of joint 155 of robot 105. Hand3D coordinate space 345 can be the coordinate space of hand 160 of robot 105. In some embodiments, Hand3D coordinate space 345 can be defined by the robot manufacturer. In some embodiments, Hand3D coordinate space 345 is a user defined offset from J6. Camera3D coordinate space 352 can be the coordinate space of camera 110. The origin of Camera3D coordinate space 352 can be at the center of projection with the z axis pointing out along the optical axis of the lens of camera 110. The x and y axes can be aligned with the rows and columns, respectively, of the camera sensor of camera 110. Raw2D coordinate space 355 can be a 2D pixel-based coordinate system defined by the rows and columns of the camera sensor of camera 110. The x axis can point from left to right along the image rows, and the y axis can point down along the columns of the camera sensor of camera 110. It should be appreciated that coordinate spaces with names containing "3D" are three-dimensional spaces, and coordinate spaces with names containing "2D" are two-dimensional spaces.

The transformations between the coordinate spaces can be rigid transformations (e.g., comprising a translation component and a rotation component) and/or transformations based on the robot calibration parameters of robot 105. For example, the transformations between CalPlate3D coordinate space 305 and RobotBase3D coordinate space 310, between RobotBase3D coordinate space 310 and Joint1 coordinate space 315, between Hand3D coordinate space 345 and Camera3D coordinate space 352, and between CalPlate3D coordinate space 305 and Camera3D coordinate space 352, can be 3D rigid transformations. The transformations between Joint1 coordinate space 315 and Joint2 coordinate space 320, between Joint2 coordinate space 320 and Joint3 coordinate space 325, between Joint3 coordinate space 325 and Joint4 coordinate space 330, between Joint4 coordinate space 330 and Joint5 coordinate space 335, and between Joint5 coordinate space 335 and Joint6 coordinate space 340 can be based on the robot calibration parameter values describing the joints and links of robot 105, and the corresponding joint angle values. In some embodiments, the transformations can be determined using a Denavit-Hartenberg matrix, where the robot parameters are d, θ, a, and alpha, as is well known in the art. The transformation from Joint6 coordinate space 340 to Hand3D coordinate space 345 can be a rigid transformation along with a variable rotational transform based on the angle value of Joint6 of robot 105. The transformation from CalPlate3D coordinate space 305 to Camera3D coordinate space 352, and the transformation from Camera3D coordinate space 352 to Raw2D coordinate space 355 can be based on a conventional camera calibration, as is well known in the art. As used herein, the notation CoordinateSpace1fromCoordinateSpace2 indicates the transformation from CoordinateSpace2 to CoordinateSpace1. For example, Joint1Frompoint2 denotes the transformation from Joint2 coordinate space 320 to Joint1 coordinate space 315.

The present technology can be used to refine the calibration parameter values used to form the transformations described above.

1. Capturing Calibration Data

Figure 4:
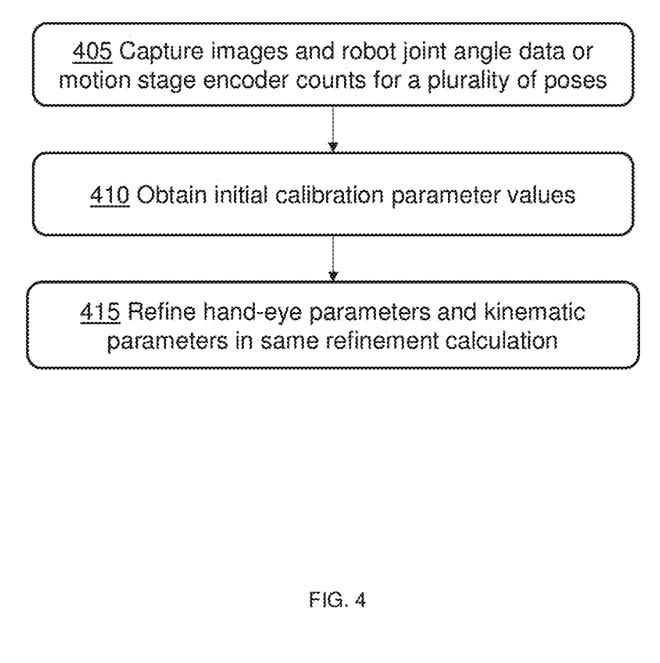
FIG. 4 depicts a flowchart of a method of calibrating a machine vision system in accordance with the technology.

FIG. 4 depicts flowchart 400 of a method of calibrating a machine vision system in accordance with the technology. The depicted method can be performed by control system 115. At step 405, control system 115 captures images and robot joint angles when the robot 105 is in a plurality of poses. At each pose, control system 115 causes camera 110 to capture an image of at least a portion of calibration target 120 that contains one or more of features 122. Control system 115 further captures the angle of each joint of robot 105 at the pose. For example, robot 105 can report the angle of each joint to control system 115.

2. Determining Initial Calibration Parameter Values

At step 410, control system 115 determines initial calibration parameter values. The initial calibration parameter values can be the values used to determine the transformations discussed with reference to FIG. 3 prior to refinement. As will be described in greater detail below, the values of these calibrations parameters can be refined in accordance with the present technology. In the illustrated example of FIG. 3, control system 115 can obtain the initial robot calibration parameter values for robot 105 based on the specification of robot 105. For example, a robot manufacturer will typically provide these values. Using these initial calibration values and joint angles for robot 105 at a particular pose, control system 115 can determine the following transformations for robot 105 at that pose: RobotBase3DFromJoint1, Joint1 FromJoint2, Joint2FromJoint3, Joint3FromJoint4, Joint4FromJoint5, Joint5FromJoint6, and Joint6FromHand3D. For example, Joint1FromJoint2, Joint2FromJoint3, Joint3FromJoint4, Joint4FromJoint5, Joint5FromJoint6 can be determined using the Denavit-Hartenberg matrix based on the D-H values provided by the robot specification and the joint angle values of robot 105 at the pose. RobotBase3DFromJoint1 can be determined based on the robot specification (e.g., the dimensions of robot 105). Joint6FromHand3D can be determined based on the robot specification of Hand3D 160 of robot 105 and the joint angle value of Joint6. Joint6FromHand3D can provide the rigid transformation of robot hand 160 in J6 340 (e.g., the Joint 6 coordinate system). Control system 115 can form the composite transformation RobotBase3DFromHand3D for a particular pose of robot 105 based on these transformations. For example, the equation below provides RobotBase3DFromHand3D:

RobotBase3DFromHand3D=RobotBase3DFromJoint1*Joint1
FromJoint2*Joint2FromJoint3*Joint3FromJoint4*Joint4
FromJoint5*Joint5FromJoint6*Joint6FromHand3D Control system 115 can perform a hand-eye calibration to determine initial hand-eye calibration parameter values. For example, control system can use the Cognex Vision Library to determine initial hand-eye calibration parameter values based on the captured images and the RobotBase3DFromHand3D transformation for a plurality of poses, along with the Camera3DFromCalPlate3D transformation. As a result of the hand-eye calibration, control system 115 can determine Camera3DFromHand3D and RobotBase3DFromCalPlate3D. With the determination of Camera3DFromHand3D and RobotBase3DFromCalPlate3D, along with the previously determined transformations, coordinates in any coordinate space of FIG. 3 can be transformed into coordinates in any other coordinate space of FIG. 3.

3. Refining Calibration Parameters

At step 415, control system 115 refines a plurality of the calibration parameters to determine more accurate values for those calibration parameters. To refine the calibration parameters, control system 115 determines the calibration parameter values that minimize a cost function. Techniques for minimizing the cost function and determining final calibration parameter values can include non-linear least squares. One of skill in the art will appreciate that other techniques can be used.

Embodiments of the technology can use a variety of cost functions. In some embodiments, the cost function can be the sum of the distances between observed locations of features (e.g., features on calibration target 120) and the expected locations of those features based on the transformations discussed. In general, this can involve the machine vision system observing the location of a feature in a first coordinate space (e.g., observing with camera 110) and applying a series of transformations to map that feature through a plurality of other coordinate spaces to the first coordinate space to calculate the expected location of that feature based on the calibration parameters. If the calibration parameters are completely accurate, the observed location and the expected location will be the same. In practice, there are typically some differences between the observed location and the expected location. In some embodiments, the cost function measures these differences for multiple features, multiple poses, and multiple images. For example, control system 115 can determine the location of a plurality of observed calibration target features in Raw2D coordinate space 355 for each robot pose (ObservedFeatureRaw2D$_{ij}$). Control system 115 can also determine the location of a plurality of mapped calibration target features in Raw2D coordinate space 355 for each robot pose MappedFeatureRaw2D$_{ij}$=Raw2DFromCamera3D*CalPlate3D FromCamera3DAtPose$_i$Estimated$^{-1}$*CalibrationTargetFeature$_j$ where CalPlate3DFromCamera3DAtPose$_i$Estimated=CalPlate3DFromRobotBase3D*RobotBase3DFromHand3DAtPose$_i$*Hand3DFromCamera3D RobotBase3DFromHand3DAtPose$_i$ is the estimated robot pose at pose i using the joint angle values at pose i and the initial calibration parameters values (or successively refined calibration parameter values).

Control system 115 can then compute the distance between the observed feature location and the mapped feature location. The cost function can be defined as follows:

$$\sum_{\text{For each camera, each pose } i, \text{ and each feature } j} \left(\text{diatance}\left(\begin{array}{c} ObservedFeatureRaw2D_{ij}, \\ MappedFeatureRaw2D_{ij} \end{array}\right)\right)^2$$

In some embodiments, the cost function measures the changes of the location of the calibration plate features after mapping using the transforms. For example, control system 115 can determine the location of a plurality of features in CalPlate3D coordinate space 305. Control system 115 can also map each feature location for the plurality features at each robot pose i of the plurality poses through the transformation CalPlate3DFromCalPlate3DAtPose$_i$, where:

CalPlate3DFromCalPlate3DAtPose$_i$=CalPlate3DFromRobotBase3D*RobotBase3DFromHand3DAtPose$_i$*Hand3DFromCamera3D*Camera3DFromCalPlate3DAtPose$_i$ Where RobotBase3DFromHand3DAtPose$_i$ is the estimated robot pose at pose i using the joint angle values at pose i and the initial calibration parameters values (or successively refined calibration parameter values).

Camera3DFromCalPlate3DAtPose$_i$ is obtained by using the observed features in Raw2D and camera calibration information.

Control system 115 can then compute the distance between the feature location and the mapped feature location. The cost function can be defined as follows:

$$\sum_{\text{For each camera, each pose } i, \text{ and each feature } j} \left(\text{diatance}\left(\begin{array}{c} CalPlate3DFromCalPlate3DAtPose_i * \\ featureCalPlate3D_j, featureCalPlate3D_j \end{array}\right)\right)^2$$

In some embodiments, the cost function can be defined without mapping feature points. If the calibration parameters are completely accurate, then CalPlate3DFromCalPlate3DAtPose$_i$ would be an identity transformation. Thus, the cost function can measure the difference between CalPlate3DFromCalPlate3DAtPose$_i$ and the identity transformation. In some embodiments, the cost function can be defined as follows:

$$\sum_{\text{For each camera, each pose } i,} \left(\begin{array}{c} CalPlate3DfromCalPlate3DAtPose_i.translation.length + w * \\ \text{absolute value} \\ (CalPlate3DfromCalPlate3DAtPose_i.rotationAngle) \end{array}\right)^2$$

Where:

CalPlate3DfromCalPlate3DAtPose$_i$.translation.length is the length of the translation component of the transformation CalPlate3DfromCalPlate3DAtPose$_i$;

CalPlate3DfromCalPlate3DAtPose$_i$.rotationAngle is the rotation amount of the transformation CalPlate3DfromCalPlate3DAtPose$_i$ (e.g., the rotation can be represented as a rotation amount around a rotation axis); and w is a weight (e.g., scale factor) for balancing the translation and rotation components.

In some embodiments, the origin of Hand3D coordinate space 345 can be used as the basis for the cost function. A transformation Hand3DFromHand3DAtPose$_i$ can be defined as follows:

Hand3DFromHand3DAtPose$_i$=Hand3DFromCamera3D*Camera3DFromCalPlate3DAtPose$_i$*CalPlate3DFromRobotBase3D*RobotBase3DFromHand3DAtPose$_i$ Where:
Hand3DFromCamera3D*Camera3DFromCalPlate3DAtPose$_i$*CalPlate3DFromRobotBase3D represents the inverse of RobotBase3DFromHand3D observed by the camera at pose i (Camera3DFromCalPlate3DAtPose$_i$ is obtained by using the observed features in Raw2D and camera calibration information).

Hand3DFromHand3DAtPose$_i$ indicates the difference between the pose based on robot calibration parameters of robot 105 and the estimated pose based on images from camera 110. If the calibration parameters are completely accurate, then Hand3DFromHand3DPose$_i$ would be an identity transformation. The cost function can be defined as follows:

$$\sum_{\text{For each camera, each pose } i,} \left( \begin{array}{c} Hand3DFromHand3DAtPose_i.translation.length + w * \\ \text{absolute value} \\ (Hand3DFromHand3DAtPose_i.rotation.angle) \end{array} \right)^2$$

In some embodiments, the cost function can measure the difference between reported joint angles for the joints of robot 105 (e.g., as measured by robot 105) and the estimated joint angles of the corresponding joints of robot 105. The cost function can estimate the joint angles for the joints of robot 105 based on the captured images and the calibration parameter values. A transformation RobotBase3DFromHand3D_estimated can be defined as follows:

RobotBase3DFromHand3D_estimated=RobotBase3DFromCalPlate3D*CalPlate3DFromCamera3DAtPose$_i$*Camera3DFromHand3D.

The inverse kinematic equations can be used to compute the joint angles corresponding to RobotBase3DFromHand3D_estimated. The cost function can be defined as follows:

$$\sum_{\substack{\text{For each camera, each pose } i \\ \text{each joint } j}} (EstimatedJointAngle - ReportedJointAngle)^2$$

OR $$\sum_{\substack{\text{For each camera, each pose } i \\ \text{each joint } j}} (EstimatedJointEncoderCount - ReportedJointEncoderCount)^2$$

Beneficially, the cost function does not need to include w for balancing the translation and rotation components.

4. Enhancing Refinement

In the illustrated example for machine vision system 100, the calibration parameters that could be refined include 32 robot calibration parameters: 20 D-H parameters for the joints of robot 105, 6 robot calibration parameters for RobotBase3DFromJoint1, and 6 robot calibration parameters for Joint6FromHand3D. The calibration parameters also include 6 parameters for Camera3DFromHand3D, and 6 parameters for RobotBase3DFromCalPlate3D bringing the total number of calibration parameters to 44 parameters.

There can be redundancy in the calibration parameters, making it unnecessary to refine all of the calibration parameters. In some embodiments, Joint6FromHand3D can be combined with Hand3DFromCamera3D to reduce the number of calibration parameters being refined. In some embodiments, RobotBase3DFromJoint1 can be combined with CalPlate3DFromRobotBase3D. Combining the transformations can reduce the calibration parameters for refining to 32 (e.g., 6 from CalPlate3DFromJoint1, 6 from Joint6FromCamera3D, and 20 from Joint1FromJoint2, . . . , Joint5FromJoint6). In some embodiments, the D-H parameter θ offset and d offset from Joint1FromJoint2 can be combined into CalPlate3DFromJoint1, reducing the number of parameters for refining to 30. In some embodiments, only select calibration parameters are refined. For example, the offsets of the theta angles (e.g., the joint origins) can be refined. Beneficially, by reducing the number of calibration parameters for refining, the speed and accuracy of refining process can be improved. In some embodiments, refining can be done in groups of calibration parameters. For example, the calibration parameter values for Camera3DFromHand3D and RobotBase3DFromCalPlate3D can be fixed while refining the 20 robot calibration parameters. Then, the 20 robot calibration parameters can be fixed and the calibration parameters for Camera3DFromHand3D and RobotBase3DFromCalPlate3D can be refined.

It should be appreciated that machine vision system 100 is an exemplary machine vision system for practicing the technology. Other configurations are contemplated. In some embodiments, steps described as performed by the control system can be performed by a motion controller, a machine vision processor, and/or a motion controller in cooperation with a machine vision processor. For example, a motion controller can direct the robot through a series of poses and cause the machine vision processor to acquire images of the calibration target at each pose. The motion controller can provide to the machine vision processor information about the robot joint angles at each pose. The motion controller can cause the machine vision processor to perform the described calibration and refinement. As another example, a machine vision processor can cause the motion controller to direct the robot through a series of poses and provide to the machine vision processor information about the robot joint angles at each pose. The machine vision processor can acquire images of the calibration target at each pose. The machine vision processor can perform the described calibration and refinement. More generally, the control system can comprise a motion controller, a machine vision processor, or any combination thereof working in concert to implement the technology herein.

In some embodiments, more than one camera can be used. In such machine vision systems, the cost function can be the combination of the cost functions for each camera. In some embodiments, a virtual 3D camera can be created. By using a virtual 3D camera, a single camera-based cost function can be used. Beneficially, by using a virtual 3D camera, the number of calibration parameters for refining can be smaller and the cameras' spatial relationship can be held constant during the refinement.

In some embodiments, multiple work spaces can be used (e.g., the robot can move within and interact with objects in more than one work space). In implementations where the camera moves with the robot, then calibration can include placing a calibration target in each workspace and collecting calibration data (e.g., images and joint angles for a plurality of robot poses) for each workspace. Each additional workspace can result in six additional calibration parameters for refining. In some embodiments, the cost function can be the combination of cost functions for each work space. In some embodiments, one or more stationary cameras can be used. If the one or more cameras are stationary, and the calibration target is mounted on the robot, then the cost functions defined above can be used by exchanging Camera3D and CalPlate3D in the equations. In some embodiments, the technology can be used for refining the calibration parameters for a machine vision system in which the robot motion only moves in two dimensions. It should be appreciated that the cost functions can be changed to use only 2D information. In such cases, due to the limitation of the robot motions, the number of robot calibration parameters for refinement can be reduced for robust refinement.

B. Calibration for Machine Vision Systems with Motion Stages

It should be appreciated that the technology can refine calibration parameters for machine vision systems including motion stages by using approaches similar to those described above. The technology can refine hand-eye calibration parameters and motion stage calibration parameters in a single refinement calculation.

Figure 5:
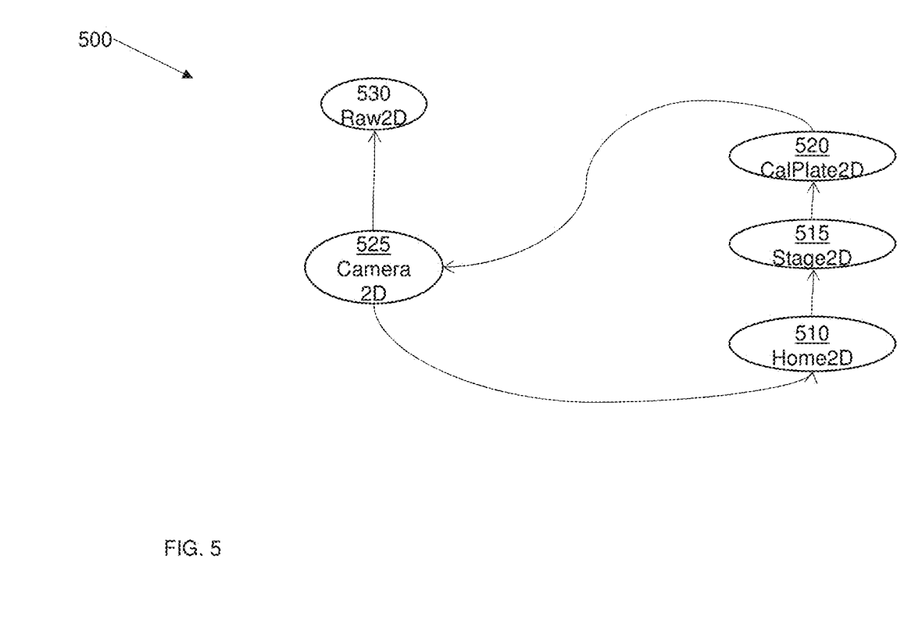
FIG. 5 depicts a calibration scheme in accordance with the technology.

FIG. 5 depicts calibration scheme 500 in accordance with the technology. In some embodiments, the calibration scheme can be used for fixed camera configurations. For example, calibration scheme 500 can be used for machine vision system 200 of FIG. 2. In FIG. 5, the ovals represent coordinate spaces. FIG. 5 includes Home2D coordinate space 510, Stage2D coordinate space 515, CalPlate2D coordinate space 520, Camera2D coordinate space 525, and Raw2D coordinate space 530. Arrows between ovals represent transformations between the illustrated coordinate spaces. The calibration parameter values used for the transformations can be determined and refined, as described with respect to the illustrative calibration methods below.

In the illustrated example, Home2D coordinate space 510 can be the coordinate space in which other coordinate spaces and their relationships are described. Home2D coordinate space 510 can be orthonormal and defined by the X axis of motion stage 205 and the center of rotation of motion stage 205. For example, the origin of Home2D coordinate space 510 can be at its center of rotation when motion stage 205 is at the home position. The x axis of Home2D coordinate space 510 can be aligned with the x axis of motion stage 205. The y axis of Home2D coordinate space 510 can be 90 degrees from the X axis and in the general direction of the y axis of motion stage 205. Stage2D coordinate space 515 can be an orthonormal coordinate space that is attached to the center of rotation of motion stage 205, and moves along with motion stage 205. CalPlate2D coordinate space 520 can be the coordinate space of calibration target 220. This space can be moved around in the Home2D coordinate space 510 coordinates by motion stage 205. CalPlate2D coordinate space 520 can be an orthonormal coordinate system, although its length unit may have a non-identity scale factor from Home2D coordinate space 510. CalPlate2D coordinate space 520 and Home2D coordinate space 510 can have different handedness. Camera2D coordinate space 525 can be the physical orthonormal coordinate space for camera 210. The origin of Camera2D coordinate space 525 can be at a position in Home2D coordinate space 510 that corresponds to the center of the image window of camera 210. Its x axis is parallel to the x axis of Raw2D coordinate space 530 at the origin of Camera2D coordinate space 525. The y axis can be 90 degrees from the x axis and in the general direction of the y axis of Raw2D coordinate space 530. Raw2D coordinate space 530 can be the pixel space coordinate system of camera 210.

The transformation between the coordinate spaces can be rigid transformations (e.g., comprising a translation component and a rotation component) and/or rigid plus handedness transforms (e.g. comprising a rigid transform plus a handedness component) and/or transformations based on the kinematic calibration parameters of motion stage 205. For example, the transformations between Camera2D coordinate space 525 and Home2D coordinate space 510 and between Stage2D coordinate space 515 and CalPlate2D coordinate space 520 can be 2D rigid transformations. The transformations between CalPlate2D coordinate space 520 and Camera2D coordinate space 525 can be 2D rigid transformation. The transformations between Home2D coordinate space 510 and Stage2D coordinate space 515 can be based on, e.g., the actuators' encoder counts. The transformation from Camera2D coordinate space 525 to Raw2D coordinate space 530 can be based on a conventional camera calibration, as is well known in the art.

1. Capturing Calibration Data

Again with reference to FIG. 4, the depicted method can be performed by control system 215 of machine vision system 200. At step 405, control system captures images and actuator encoder counts when motion stage 205 is in a plurality of poses. At each pose, control system 215 causes the camera to capture an image of at least a portion of calibration target 220 that contains one or more features. Control system 215 further captures the encoder count for each actuator of motion stage 2015 at each pose.

2. Determining Initial Calibration Parameter Values

At step 410, control system 215 determines initial calibration parameter values. The initial calibration parameter values can be the values used to determine the transformations discussed with reference to FIG. 5 prior to refinement. The values of these calibrations parameters can be refined in accordance with the present technology. In the illustrated example of FIG. 4, control system 215 can obtain the initial motion stage calibration parameter values for motion stage 205 based on the specification of motion stage 205. For example, a motion stage manufacturer will typically provide these values. Using these initial calibration values and the encoder counts at a particular pose, control system 215 can determine the transformation Home2DFromStage2D.

Control system 215 can perform a hand-eye calibration to determine initial hand-eye calibration parameter values. For example, control system 215 can use the Cognex Vision Library to determine initial hand-eye calibration parameter values based on the captured images and the Home2DFromStage2D transformation for a plurality of poses. As a result of the hand-eye calibration, control system 215 can determine Stage2DFromCalPlate2D, CalPlate2DFromCamera2D, and Camera2DfromHome2D.

3. Refining Calibration Parameters

At step 415, control system 215 refines a plurality of the calibration parameters to determine more accurate values for those calibration parameters. To refine the calibration parameters, control system 215 determines the calibration parameters that minimize a cost function. In general, the cost functions can be based on comparing motion stage 205 motions (e.g., as determined from the actual encoder counts read from the motion stage) and the observed camera or calibration target motions (e.g., based on the images captured by the camera). Embodiments of the technology can use a variety of cost functions.

In some embodiments, the cost function can measure the differences between the observed encoder count (e.g., as read from the motion stage) and the expected/estimated encoder count as calculated using the initial calibration parameter values (or successively refined calibration parameter values). For example, for each motion stage poses i, an estimated motion stage pose i' (e.g., in Home2D coordinate space 510) can be computed. Pose i' can be computed as follows:

Pose
i'=Home2DFromCamera2D*Camera2DFromCalPlate
2DAtPose$_i$*Plate2DFromStage2D

Where Camera2DFromCalPlate2DAtPose$_i$ is computed from image features and the camera calibration information.

Estimated encoder counts for pose i can be computed based on pose i' and the initial calibration parameter values (or successively refined calibration parameter values).

The cost function can be the sum of the squares of encoder count differences for every actuator, for every pose, and for every camera (in multiple camera machine vision systems). The cost function can be defined as follows:

$$\sum_{\substack{\text{for each} \\ \text{camera}}} \sum_{\substack{\text{for each} \\ \text{pose } i}} \sum_{\substack{\text{for each} \\ \text{actuator } j}} (\text{Read encoder count} - \text{Estimated encoder count})^2$$

In some embodiments, the cost function can measure the differences between the observed location of features in Raw2D and the expected (mapped) location of features in Raw2D. The transformation MappedFeatureRaw2D$_{ij}$ can be defined as follows:

MappedFeatureRaw2D$_{ij}$=Raw2DFromCamera2D*CalPlate
2DFromCamera2DAtPose$_i$Estimated$^{-1}$*Calibra-
tionTargetFeature$_j$ where
CalPlate2DFromCamera2DAtPose$_i$Estimated=CalPlate
2DFromStage2D*Home2DFromStage2DAtPose$_i^{-1}$*
Home2DFromCamera2D Home2DFromStage2DAtPose$_i$ can be computed based on the encoder counts read from motion stage 205 at pose i and the initial calibration parameter values (or successively refined calibration parameter values). Control system 115 can then compute the distance between the observed feature location and the mapped feature location. The cost function can be defined as follows:

$$\sum_{\substack{\text{For each camera, each pose } i, \\ \text{and each feature } j}} \left( \text{diatance} \begin{pmatrix} ObservedFeatureRaw2D_{ij}, \\ MappedFeatureRaw2D_{ij} \end{pmatrix} \right)^2$$

In some embodiments, the cost function can measure the differences between the location of features in CalPlate2D and the mapped location of features on calibration target 220. For example, Home2DFromStage2DAtPose$_i$ can be computed based on the encoder counts read from motion stage 205 at pose i and the initial calibration parameter values (or successively refined calibration parameter values). The transformation CalPlate2DFromCalPlate2DAtPose$_i$ can be computed as follows:

CalPlate2DFromCalPlate2DAtPose$_i$=CalPlate2DFrom
Stage2D*Home2DFromStage2DAt
Pose$_i^{-1}$
i*Home2DFromCamera2D*Camera2DFromPlate2DAtPose$_i$ Where Home2DFromStage2DAtPose$_i$ can be computed based on the encoder counts read from motion stage 205 at pose i and the initial calibration parameter values (or successively refined calibration parameter values) Camera2DFromCalPlate2DAtPose$_i$ is obtained by using the observed features in Raw2D and camera calibration information.

The transformation CalPlate2DFromCalPlate2DAtPose$_i$ can be used to map calibration target features at pose i. The cost function can then be defined as follows:

$$\sum_{\substack{\text{for each} \\ \text{cameracamera ID}}} \sum_{\substack{\text{for each} \\ \text{pose } i}} \sum_{\substack{\text{for each} \\ \text{feature } j}} \left( \text{diatance} \begin{pmatrix} CalPlate2DFromCalPlate2DAtPose_i * \\ featureCalPlate2D_j, featureCalPlate2D_j \end{pmatrix} \right)^2$$

With respect to UVW motion stages, motion stage calibration parameters can include, for each actuator, the actuator's roller's center position, the roller's radius, the actuator's direction, the actuator's step size, the actuator's home encoder count, and the actuator's striker plate's direction. In some embodiments, a subset of the UVW motion stage's motion stage calibration parameters can be refined. For example, in some embodiments, the roller's radius is not refined. In some embodiments, the home encoder count is not refined. As noted above, refinement efficiency can be increased by reducing the number of calibration parameters being refined. With respect to XY Theta motion stages, motion stage calibration parameters can include, for each of the X and Y actuators, the actuator's direction and the actuator's step size. For the theta actuator, motion stage calibration parameters can include the actuator's roller's center position, the roller's radius, and the actuator's striker plate's direction. In some embodiments, a subset of the XY Theta motion stage's motion stage calibration parameters can be refined. For example, in some embodiments, the roller's radius is not refined.

It should be appreciated that machine vision system 200 is an exemplary machine vision system for practicing the technology. Other configurations are contemplated. In some embodiments, steps described as performed by the control system can be performed by a motion controller, a machine vision processor, and/or a motion controller in cooperation with a machine vision processor. For example, a motion controller can direct the motion stage through a series of poses and cause the machine vision processor to acquire images of the calibration target at each pose. The motion controller can provide to the machine vision processor information about the motion stage at each pose. The motion controller can cause the machine vision processor to perform the described calibration and refinement. As another example, a machine vision processor can cause the motion controller to direct the motion stage through a series of poses and provide to the machine vision processor information about the motion stage at each pose. The machine vision processor can acquire images of the calibration target at each pose. The machine vision processor can perform the described calibration and refinement. More generally, the control system can comprise a motion controller, a machine vision processor, or any combination thereof working in concert to implement the technology herein.

In some embodiments, one or more stationary cameras can be used as described above. If the one or more cameras are moving cameras, that is the cameras are rigidly attached to the motion stage, and the calibration target is stationary, then the cost functions defined above can be used by exchanging Camera2D and CalPlate2D in the equations.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a web browser through which a user can interact with an example implementation, and/or other graphical user interfaces for a transmitting device. The above described techniques can be implemented in a distributed computing system that includes any combination of such back-end, middleware, or front-end components.

The components of a computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), a Peer-to-Peer (P2P) protocol, Hypertext Transfer Protocol (HTTP), Session Initiation Protocol (SIP), a Global System for Mobile Communications (GSM) protocol, Universal Mobile Telecommunications System (UMTS), 3GPP Long Term Evolution (LTE) and/or other communication protocols.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A machine vision system comprising:
   a robot;
   a camera; and
   a control system in communication with the robot and the camera, the control system configured to:
   move the robot to a plurality of poses, and for each pose of the plurality of poses:
   capture, with the camera, an image of one or more features on a calibration target; and
   capture a plurality of robot joint angles;
   obtain a plurality of initial values for a plurality of robot calibration parameters;

determine a plurality of initial values for a plurality of hand-eye calibration parameters based on the plurality of initial values for the plurality of robot calibration parameters, and the image and the plurality of robot joint angles captured for each of the plurality of poses;

determine a plurality of final values for the plurality of hand-eye calibration parameters and a plurality of final values for the robot calibration parameters by refining one or more of the plurality of hand-eye calibration parameters and one or more of the plurality of robot calibration parameters to minimize a cost function.

2. The machine vision system of claim 1, wherein the control system is further configured to:

use the plurality of final values for the plurality of hand-eye calibration parameters and the plurality of final values for the robot calibration parameters for a vision guided robot application.

3. The machine vision system of claim 1, wherein the control system is further configured to:

move the robot using the plurality of final values for the robot calibration parameters.

4. The machine vision system of claim 1, wherein the cost function measures, for each pose of the plurality of poses, a difference between an observed location of a feature in the image captured for the pose and an expected location of the feature, the expected location determined based on a first plurality of values for the plurality of robot calibration parameters, a second plurality of values for the plurality of hand-eye calibration parameters, and the plurality of robot joint angles captured for the pose.

5. The machine vision system of claim 1, wherein the cost function measures, for each pose of the plurality of poses, a difference between a composite transformation and an identity transformation, the composite transformation being a composition of a first transformation from a first coordinate space to a second coordinate space and a second transformation from the second coordinate space to the first coordinate space, the first transformation and the second transformation determined based on a first plurality of values for the plurality of robot calibration parameters, a second plurality of values for the plurality of hand-eye calibration parameters, the plurality of observed features of the calibration target for the pose, and the plurality of robot joint angles captured for the pose.

6. The machine vision system of claim 1, wherein the cost function measures, for each pose of the plurality of poses, a difference between a robot joint angle of the plurality of robot joint angles captured for the pose and an estimated joint angle for the pose, the estimated joint angle determined based on a first plurality of values for the plurality of robot calibration parameters, a second plurality of values for the plurality of hand-eye calibration parameters, and the plurality of observed features of the calibration target for the pose.

7. The machine vision system of claim 1, wherein the control system is further configured to minimize the cost function using non-linear least squares.

8. The machine vision system of claim 1, wherein the control system is configured to refine less than all of the plurality of hand-eye calibration parameters and less than all of the plurality of robot calibration parameters.

9. The machine vision system of claim 1, wherein the plurality of robot calibration parameters comprises Denavit-Hartenberg parameters for the robot.

10. A machine vision system-implemented calibration method comprising:

moving, by a control system, a robot to a plurality of poses, and for each pose of the plurality of poses:
capturing, by a camera, an image of one or more features on a calibration target; and
capturing, by the control system, a plurality of robot joint angles;

obtaining, by the control system, a plurality of initial values for a plurality of robot calibration parameters;

determining, by the control system, a plurality of initial values for a plurality of hand-eye calibration parameters based on the plurality of initial values for the plurality of robot calibration parameters, and the image and the plurality of robot joint angles captured for each of the plurality of poses;

determining, by the control system, a plurality of final values for the plurality of hand-eye calibration parameters and a plurality of final values for the plurality of robot calibration parameters by refining one or more of the plurality of hand-eye calibration parameters and one or more of the plurality of robot calibration parameters to minimize a cost function.

11. The method of claim 10, wherein the cost function measures, for each pose of the plurality of poses, a difference between an observed location of a feature in the image captured for the pose and an expected location of the feature, the expected location determined based on a first plurality of values for the plurality of robot calibration parameters, a second plurality of values for the plurality of hand-eye calibration parameters, and the plurality of robot joint angles captured for the pose.

12. The method of claim 10, wherein the cost function measures, for each pose of the plurality of poses, a difference between a composite transformation and an identity transformation, the composite transformation being a composition of a first transformation from a first coordinate space to a second coordinate space and a second transformation from the second coordinate space to the first coordinate space, the first transformation and the second transformation determined based on a first plurality of values for the plurality of robot calibration parameters, a second plurality of values for the plurality of hand-eye calibration parameters, the plurality of observed features of the calibration target for the pose, and the plurality of robot joint angles captured for the pose.

13. The method of claim 10, wherein the cost function measures, for each pose of the plurality of poses, a difference between a robot joint angle of the plurality of robot joint angles captured for the pose and an estimated joint angle for the pose, the estimated joint angle determined based on a first plurality of values for the plurality of robot calibration parameters, a second plurality of values for the plurality of hand-eye calibration parameters, and the plurality of observed features of the calibration target for the pose.

14. The method of claim 10, further comprising minimizing the cost function using non-linear least squares.

15. The method of claim 10, further comprising refining less than all of the plurality of hand-eye calibration parameters and less than all of the plurality of robot calibration parameters.

16. The method of claim 10, wherein the plurality of robot calibration parameters comprises Denavit-Hartenberg parameters for the robot.

17. A machine vision system comprising:
a motion stage;
a camera; and
a control system in communication with the motion stage and the camera, the control system configured to:

move the motion stage to a plurality of poses, and for each pose of the plurality of poses:
  capture, with the camera, an image of one or more features on a calibration target; and
  capture a plurality of encoder counts for a plurality of actuators of the motion stage;
obtain a plurality of initial values for a plurality of motion stage calibration parameters;
determine a plurality of initial values for a plurality of hand-eye calibration parameters based on the plurality of initial values for the plurality of motion stage calibration parameters, and the image and the plurality of encoder counts captured for each of the plurality of poses;
determine a plurality of final values for the plurality of hand-eye calibration parameters and a plurality of final values for the motion stage calibration parameters by refining one or more of the plurality of hand-eye calibration parameters and one or more of the plurality of motion stage calibration parameters to minimize a cost function.

18. The machine vision system of claim 17, wherein the control system is further configured to:
use the plurality of final values for the plurality of hand-eye calibration parameters and the plurality of final values for the motion stage calibration parameters for a vision guided motion stage application.

19. The machine vision system of claim 17, wherein the control system is further configured to:
move the motion stage using the plurality of final values for the motion stage calibration parameters.

20. The machine vision system of claim 17, wherein the cost function measures, for each pose of the plurality of poses, a difference between an observed location of a feature in the image captured for the pose and an expected location of the feature, the expected location determined based on a first plurality of values for the plurality of motion stage calibration parameters, a second plurality of values for the plurality of hand-eye calibration parameters, and the plurality of encoder counts captured for the pose.

21. The machine vision system of claim 17, wherein the cost function measures, for each pose of the plurality of poses, a difference between an encoder count of the plurality of encoder counts captured for the pose and an estimated encoder count for the pose, the estimated encoder count determined based on a first plurality of values for the plurality of motion stage calibration parameters, a second plurality of values for the plurality of hand-eye calibration parameters, and the plurality of observed features of the calibration target for the pose.

22. The machine vision system of claim 17, wherein the control system is further configured to minimize the cost function using non-linear least squares.

23. The machine vision system of claim 17, wherein the control system is configured to refine less than all of the plurality of hand-eye calibration parameters and less than all of the plurality of motion stage calibration parameters.

24. The machine vision system of claim 17, wherein the plurality of motion stage calibration parameters comprises one or more of roller center position, roller radius, direction, step size, home encoder count, and striker plate's direction for an actuator.

25. A machine vision system-implemented calibration method comprising:
moving, by a control system, a motion stage to a plurality of poses, and for each pose of the plurality of poses:
  capture, by a camera, an image of one or more features on a calibration target; and
  capturing, by the control system, a plurality of encoder counts for a plurality of actuators of the motion stage;
obtaining, by the control system, a plurality of initial values for a plurality of motion stage calibration parameters;
determining, by the control system, a plurality of initial values for a plurality of hand-eye calibration parameters based on the plurality of initial values for the plurality of motion stage calibration parameters, and the image and the plurality of encoder counts captured for each of the plurality of poses;
determining, by the control system, a plurality of final values for the plurality of hand-eye calibration parameters and a plurality of final values for the motion stage calibration parameters by refining one or more of the plurality of hand-eye calibration parameters and one or more of the plurality of motion stage calibration parameters to minimize a cost function.

26. The method of claim 25, wherein the cost function measures, for each pose of the plurality of poses, a difference between an observed location of a feature in the image captured for the pose and an expected location of the feature, the expected location determined based on a first plurality of values for the plurality of motion stage calibration parameters, a second plurality of values for the plurality of hand-eye calibration parameters, and the plurality of encoder counts captured for the pose.

27. The method of claim 25, wherein the cost function measures, for each pose of the plurality of poses, a difference between an encoder count of the plurality of encoder counts captured for the pose and an estimated encoder count for the pose, the estimated encoder count determined based on a first plurality of values for the plurality of motion stage calibration parameters, a second plurality of values for the plurality of hand-eye calibration parameters, and the plurality of observed features of the calibration target for the pose.

28. The method of claim 25, further comprising minimizing the cost function using non-linear least squares.

29. The method of claim 25, further comprising refining less than all of the plurality of hand-eye calibration parameters and less than all of the plurality of motion stage calibration parameters.

30. The method of claim 25, wherein the plurality of motion stage calibration parameters comprises one or more of roller center position, roller radius, direction, step size, home encoder count, and striker plate's direction for an actuator.

* * * * *